United States Patent

Allen et al.

[11] Patent Number: 5,974,265
[45] Date of Patent: Oct. 26, 1999

[54] DIFFERENT VARIABLE FORMAT ONE-TIME-USE CAMERA WITH COMMON FILM ENCODEMENT DEVICE

[75] Inventors: Michael R. Allen, Churchville; Jude A. Sangregory, Spencerport, both of N.Y.

[73] Assignee: Eastman Kodak Company, Rochester, N.Y.

[21] Appl. No.: 09/096,270

[22] Filed: Jun. 11, 1998

[51] Int. Cl.[6] ............................ G03B 17/02; G03B 17/24; G03B 13/10
[52] U.S. Cl. .............................. 396/6; 396/317; 396/380; 396/543
[58] Field of Search .................................. 396/310, 315, 396/317, 373, 378, 380, 543, 6

[56] References Cited

U.S. PATENT DOCUMENTS

| | | | |
|---|---|---|---|
| 4,831,399 | 5/1989 | Tsurukawa et al. | 396/277 |
| 5,059,993 | 10/1991 | Harvey | 396/263 |
| 5,066,971 | 11/1991 | Kodaira | 396/380 |
| 5,253,001 | 10/1993 | Alyfuku et al. | 396/311 |
| 5,255,030 | 10/1993 | Mukai et al. | 396/20 |
| 5,325,140 | 6/1994 | Torikoshi et al. | 396/84 |
| 5,414,463 | 5/1995 | Katoh et al. | 348/207 |
| 5,539,490 | 7/1996 | Kang et al. | 396/348 |
| 5,552,845 | 9/1996 | Nagano et al. | 396/380 |
| 5,555,058 | 9/1996 | Huang et al. | 396/378 |
| 5,592,252 | 1/1997 | Kobayashi et al. | 356/380 |
| 5,619,737 | 4/1997 | Horning et al. | 396/195 |
| 5,640,631 | 6/1997 | Saito | 396/380 |
| 5,732,297 | 3/1998 | Tanaka et al. | 396/380 |

*Primary Examiner*—Eddie C. Lee
*Attorney, Agent, or Firm*—Roger A. Fields

[57] ABSTRACT

A group of two different variable format cameras comprise a viewfinder in each of the cameras; a single format mask supported for movement into and out of the viewfinder in one of the cameras, and an identical format mask supported for movement into and out of the viewfinder in the other camera; a format-encodement-on-film closeable switch in one of the cameras, and an identical switch in the other camera; and a closing actuator connected to the mask in one of the cameras to close the switch in that camera when the mask is moved into the viewfinder in that camera, and a different closing actuator connected to the mask in the other camera to close the switch in that camera when the mask is moved out of the viewfinder in that camera. Preferably, a single format-encodement-on-film light source is connected with the format-encodement-on-film closeable switch in one of the cameras to provide an optical encodement on film when that switch is closed, and an identical light source is connected with the format-encodement-on-film closeable switch in the other camera to provide an optical encodement on film when that switch is closed. This arrangement provides a savings of parts desirable in low cost cameras such as one-time-use cameras.

2 Claims, 6 Drawing Sheets

DIFFERENT VARIABLE FORMAT ONE-TIME-USE CAMERA WITH COMMON FILM ENCODEMENT DEVICE

FIELD OF THE INVENTION

The invention relates generally to the field of photography, and in particular to low cost cameras. More specifically, the invention relates to different variable format one-time-use cameras.

BACKGROUND OF THE INVENTION

Reloadable and one-time-use cameras for the new worldwide "Advanced Photo System" can give you not just one print format, but a choice of three. For the classic proportions of a 35 mm print, the photographer chooses the "C" format. For a wider view, the full-frame "H" format is chosen. And for an even wider look, the "P" format is chosen to provide a sweeping panoramic print. The camera records the choice of print format magnetically and/or optically on one longitudinal edge of the filmstrip for each exposed image area. The standard encodement on film for the "H" format is the binary 0, 0, i.e. no recorded data bits. The standard encodement on film for the "P" format is either the binary 0, 1 or the binary 1, 0, i.e. one recorded data bit. The standard encodement on film for the "C" format is the binary 1, 1, i.e. two recorded data bits.

The photofinisher's equipment reads the optical or magnetic encodements on film, and automatically prints each print in the encoded "C", "H" or "P" format. A "C" format print is typically 4×6 inches. An "H" format print is typically 4×7 inches. And a "P" format print is typically 4×10 inches or 4×11.5 inches.

No matter which format is selected in the camera, "C", "H" or "P", the exposed image areas on the filmstrip are always in the "H" format. This allows re-prints to be made in any of the three formats rather than just in the selected format. This is a further advantage of the "Advanced Photo System".

In order for the photographer to know how much of the subject being photographed will be included in the "C", "H" or "P" format print, the viewfinder in the camera typically includes a variable state masking device, such as a mechanical masking blade or an electronic masking liquid crystal display, for framing the subject according to the particular format that is selected. A manually operated format selector is provided to change the state of the masking device to the view the desired format in the viewfinder. This is shown, for example, in U.S. Pat. No. 5,619,737 issued Apr. 8, 1997.

SUMMARY OF THE INVENTION

A group of two different variable format cameras comprising:

a viewfinder in each of the cameras;

a single format mask supported for movement into and out of the viewfinder in one of the cameras, and an identical format mask supported for movement into and out of the viewfinder in the other camera;

a format-encodement-on-film closeable switch in one of the cameras, and an identical switch in the other camera; and a closing actuator connected to the mask in one of the cameras to close the switch in that camera when the mask is moved into the viewfinder in that camera, and a different closing actuator connected to the mask in the other camera to close the switch in that camera when the mask is moved out of the viewfinder in that camera. Preferably, a single format-encodement-on-film light source is connected with the format-encodement-on-film closeable switch in one of the cameras to provide an optical encodement on film when that switch is closed, and an identical light source is connected with the format-encodement-on-film closeable switch in the other camera to provide an optical encodement on film when that switch is closed. This arrangement provides a savings of parts desirable in low cost cameras such as one-time-use cameras.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
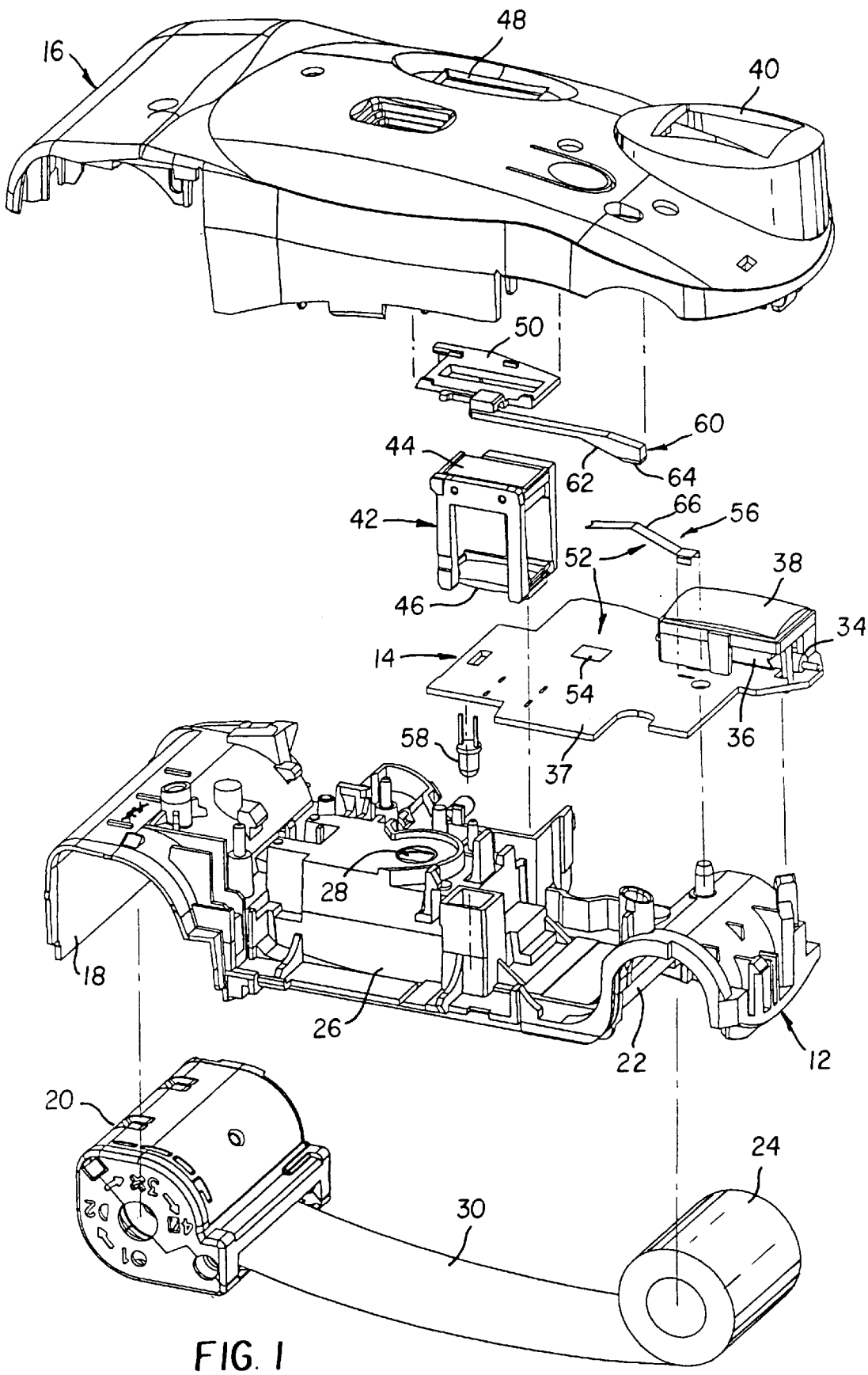
FIG. 1 is an exploded front perspective view of an alternative "H" and "P" format one-time-use camera according to a preferred embodiment of the invention.
Figure 2:
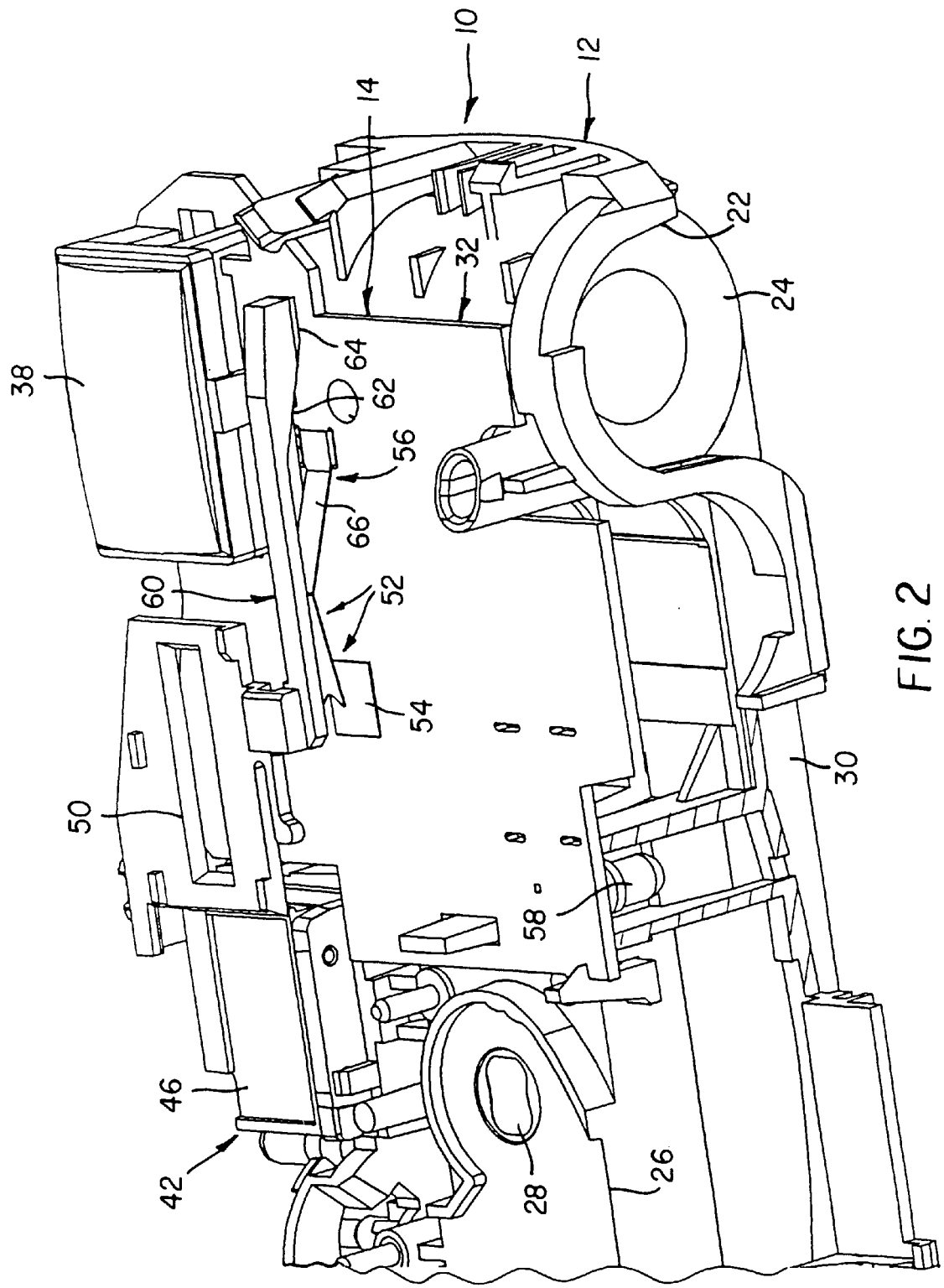
FIG. 2 is an assembled front perspective view of the camera in FIG. 1, showing the camera in the "H" format mode.
Figure 3:
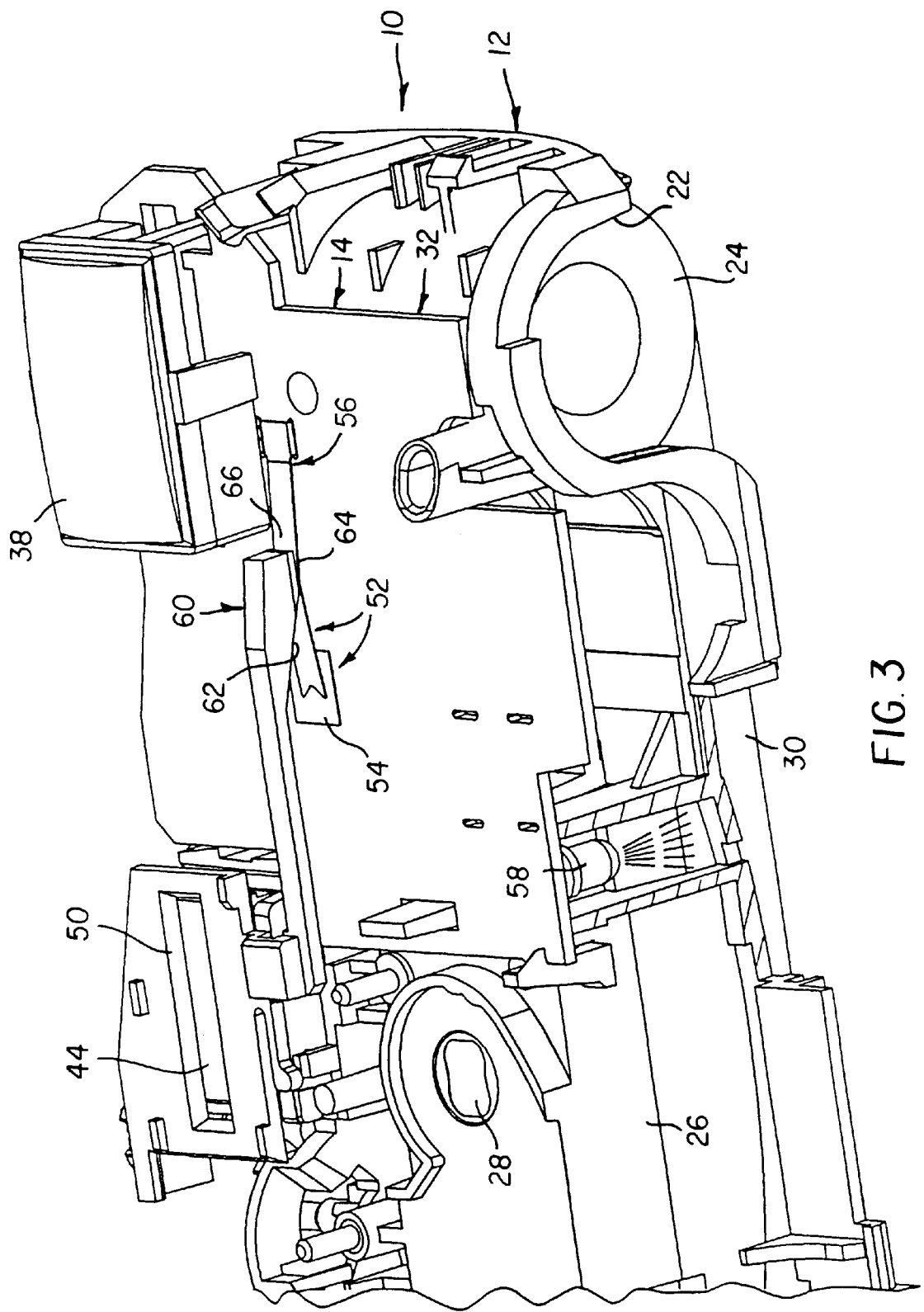
FIG. 3 is an assembled front perspective view of the camera in FIG. 1, showing the camera in the "P" format mode.

FIGS. 1–3: "H" and "P" Format One-Time-Use Camera

Referring now to the drawings, FIGS. 1–3 partially show an alternative "H" and "P" format one-time-use camera 10 including an opaque main body part 12 and an electronic flash 14. An opaque front cover part 16 and a mating opaque rear cover part (not shown) house the main body part 12 and the electronic flash 14 between them.

The main body part 12 has a rearwardly open cartridge receiving chamber 18 for a known "Advanced Photo System" film cartridge 20 and a rearwardly open film roll chamber 22 for an unexposed film roll 24. An exposure chamber 26 with a front light-admitting opening, i.e. a front exposure aperture, 28 is located between the cartridge receiving and film roll chambers 18 and 22 for exposing successive image areas of a filmstrip 30 initially stored on the unexposed film roll 24 in the film roll chamber 22. A film winding thumbwheel (not shown) is rotatably supported on the main body part 12 and has a depending coaxial stem in coaxial engagement with the protruding end of a film spool (not shown) inside the film cartridge 20 in the cartridge receiving chamber 18. Winding rotation of the film winding thumbwheel (counter-clockwise in FIG. 1) similarly rotates the film spool to wind each exposed image area of the filmstrip 30 into the film cartridge 20.

The electronic flash 14 includes a substantially flat flash circuit board 32 on which is supported a flash tube 34, a flash reflector 36 and a transparent flash cover 38. The transparent flash cover 38 is located behind a flash opening 40 in the front cover part 16. See FIG. 1.

An "H" format defining viewfinder 42 includes a pair of optically aligned front and rear viewfinder lenses 44 and 46. The front viewfinder lens 44 is located behind an "H" format front viewfinder opening 48 in the front cover part 16. See FIG. 1. The encodement on film for the "H" format available in the "H" and "P" format one-time-use camera 10 is a binary 0, 0, i.e. no recorded data bits.

A "P" format defining mask 50 is supported on the inside of the front cover part 16 for translation to an operative partial-masking position between the front viewfinder lens 44 and the front viewfinder opening 48 in the front cover part and an idle non-masking position removed from between the front viewfinder lens and the front viewfinder opening. FIG. 2 shows the "P" format defining mask 50 in its idle non-masking position. FIG. 3 shows the "P" format defining mask 50 in its operative partial-masking position.

A "P" format-encodement-on-film closeable switch 52 supported on the flash circuit board 32 comprises a fixed switch member 54 and a resilient movable switch member 56. See FIGS. 1–3.

A "P" format-encodement-on-film light emitting diode (LED) 58 is connected with the closeable switch 52 to be briefly illuminated responsive to shutter-opening when the switch is closed, in order to expose a single data bit, i.e. a binary 1, 0 on the filmstrip 30 adjacent an exposed image area. See FIGS. 1–3. Thus, the encodement on film for the "P" format to be used in the "H" and "P" format one-time-use camera 10 is the binary 1, 0, i.e. one recorded data bit.

No matter which format is selected in the camera 10, "H" or "P", the exposed image areas on the filmstrip 30 are always in the "H" format. The "H" format portion of an exposed image area on the filmstrip 30 has a width of approximately 27.4 mm and a height of approximately 15.6 mm. By contrast, the "P" format portion of an exposed image area of the filmstrip 30 has a width of approximately 27.4 mm and a height of approximately 9.6 mm.

As can be seen from FIGS. 2 and 3, when the P" format defining mask 50 is translated (to the left) from its idle non-masking position removed from between the front viewfinder lens 44 and the front viewfinder opening 48 in the front cover part 16 to its operative partial-masking position between the front viewfinder lens and the front viewfinder opening, a switch closing actuator 60 connected to the mask bears against the resilient movable switch member 56 to press that switch member against the fixed switch member 54, in order to close the "P" format-encodement-on-film closeable switch 52. Consequently, the "P" format-encodement-on-film LED 58 is briefly illuminated to expose a single data bit, i.e. the binary 1, 0, on the filmstrip 30 adjacent an exposed image area. The switch closing actuator 60 has an inclined actuating surface 62 followed by a flat holding surface 64 which in succession bear against an inclined follower surface 66 on the resilient movable switch member 56 to press that switch member against the fixed switch member 54.

Figure 4:
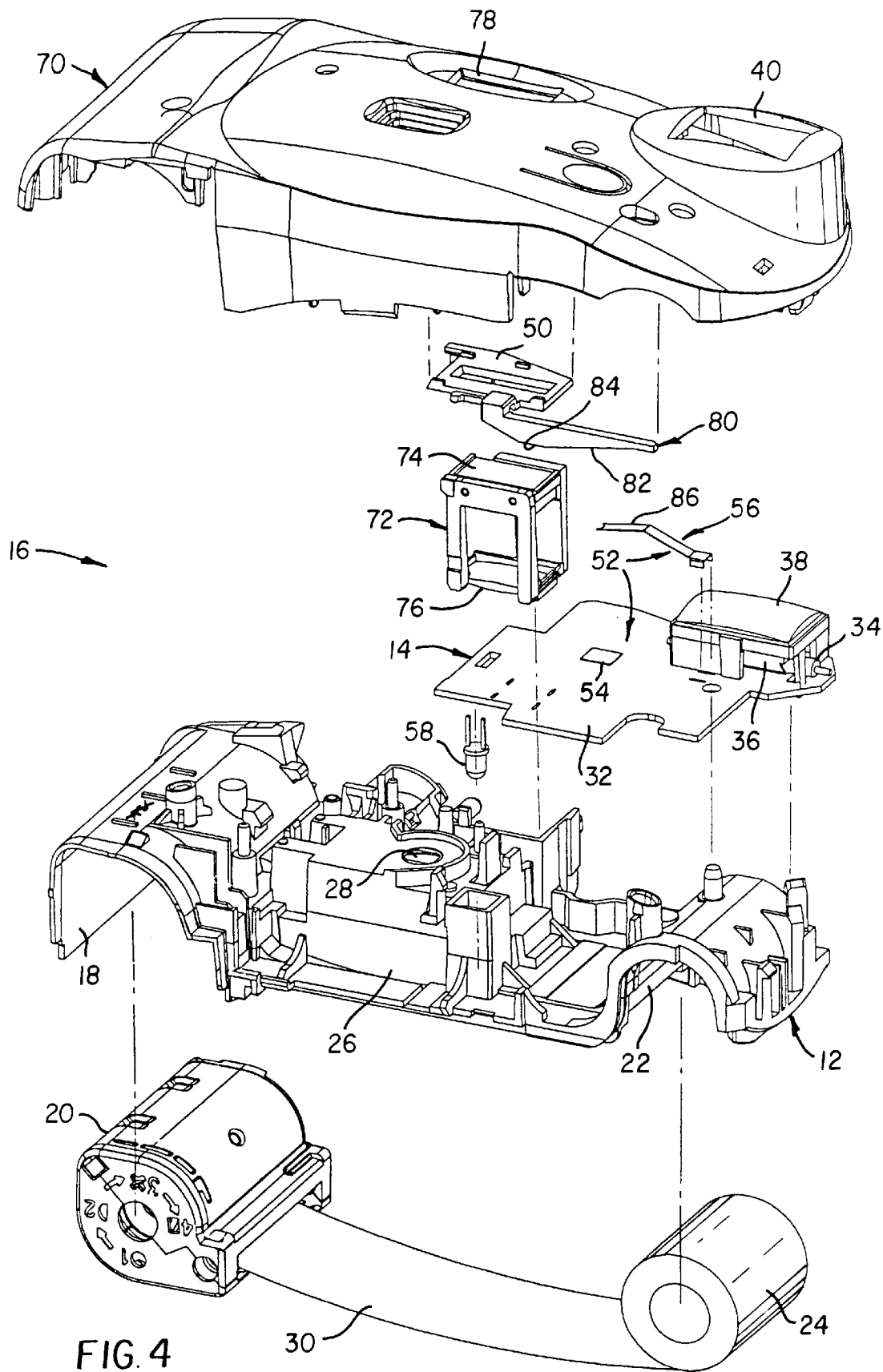
FIG. 4 is a an exploded front perspective view of an alternative "C" and "P" format one-time-use camera according to a preferred embodiment of the invention.
Figure 5:
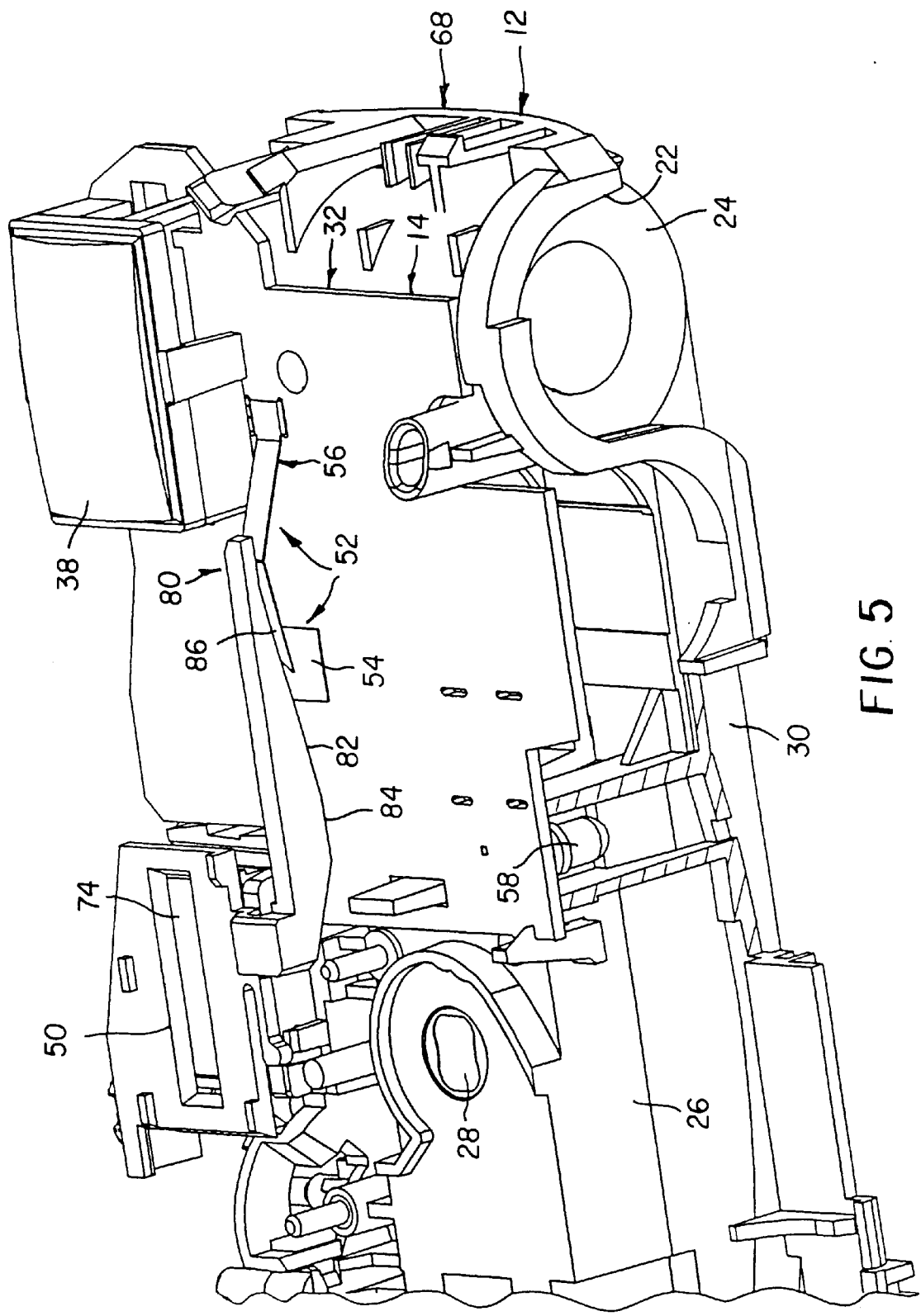
FIG. 5 is an assembled front perspective view of the camera in FIG. 4, showing the camera in the "C" format mode.
Figure 6:
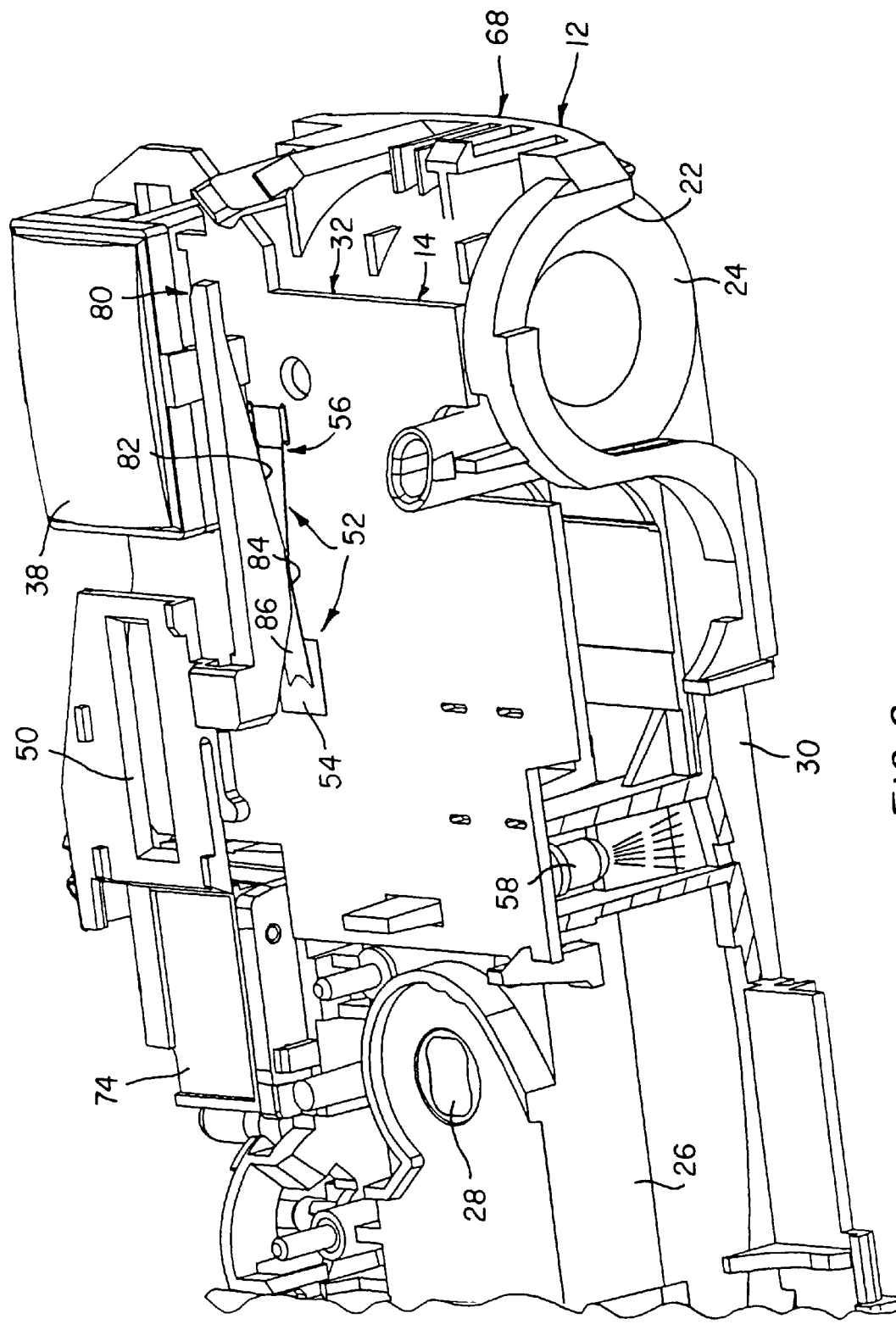
FIG. 6 is an assembled front perspective view of the camera in FIG. 5, showing the camera in the "P" format mode.

FIGS. 4–6: "C" and "P" Format One-Time-Use Camera

FIGS. 4–6 partially show an alternative "C" and "P" format one-time-use camera 68 including an opaque main body part 12, identical to the main body part 12 in FIG. 1, and an electronic flash 14, identical to the electronic flash 14 in FIG. 1. An opaque front cover part 70 and a mating opaque rear cover part (not shown) house the main body part 12 and the electronic flash 14 between them.

As in FIG. 1, the main body part 12 in FIG. 4 has a rearwardly open cartridge receiving chamber 18 for a known "Advanced Photo System" film cartridge 20 and a rearwardly open film roll chamber 22 for an unexposed film roll 24. An exposure chamber 26 with a front light-admitting opening, i.e. a front exposure aperture, 28 is located between the cartridge receiving and film roll chambers 18 and 22 for exposing successive image areas of a filmstrip 30 initially stored on the unexposed film roll 24 in the film roll chamber 22. A film winding thumbwheel (not shown) is rotatably supported on the main body part 12 and has a depending coaxial stem in coaxial engagement with the protruding end of a film spool (not shown) inside the film cartridge 20 in the cartridge receiving chamber 18. Winding rotation of the film winding thumbwheel (counter-clockwise in FIG. 4) similarly rotates the film spool to wind each exposed image area of the filmstrip 30 into the film cartridge 20.

As in FIG. 1, the electronic flash 14 in FIG. 4 includes a substantially flat flash circuit board 32 on which is supported a flash tube 34, a flash reflector 36 and a transparent flash cover 38. The transparent flash cover 38 is located behind a flash opening 40 in the front cover part 16.

As contrasted with the filmstrip 30 in the "H" and "P" format one-time-use camera 10, the same filmstrip in the "C" and "P" format one-time-use camera 68 is provided with a manufacturer-encoded binary 0, 1, i.e. a "P" format encodement, for each exposed image area. (The filmstrip 30 in the "H" and "P" format one-time-use camera 10 does not include any manufacturer-provided format encodement).

A "C" format defining viewfinder 72 includes a pair of optically aligned front and rear viewfinder lenses 74 and 76. The front viewfinder lens 74 is located behind a "C" format front viewfinder opening 78 in the front cover part 70. See FIG. 4.

A "P" format defining mask 50, identical in construction and location to the "P" format defining mask 50 in FIG. 1, is supported on the inside of the front cover part 70 for translation to an operative partial-masking position between the front viewfinder lens 74 and the front viewfinder opening 78 in the front cover part and an idle non-masking position removed from between the front viewfinder lens and the front viewfinder opening. FIG. 5 shows the "P" format defining mask 50 in its operative partial-masking position. FIG. 6 shows the "P" format defining mask 50 in its idle non-masking position.

A "C" format-encodement-on-film closeable switch 52, identical in construction and location to the "P" format-encodement-on-film closeable switch 52 in FIG. 1, is supported on the flash circuit board 32 and comprises a fixed switch member 54 and a resilient movable switch member 56. See FIGS. 4–6.

A "C" format-encodement-on-film light emitting diode (LED) 58, identical in construction and location to the "P" format-encodement-on-film LED 58 in FIG. 1, is connected with the closeable switch 52 to be briefly illuminated when the switch is closed, in order to expose a single data bit, i.e. a binary 1 (immediately before the manufacturer-provided binary 1) on the filmstrip 30 adjacent an exposed image area. See FIGS. 4–6. Thus, the encodement on film for the "C" format to be used in the "C" and "P" format one-time-use camera 10 is the binary 1, 1, i.e. two recorded data bits (one manufacturer provided and the other camera provided).

No matter which format is selected in the camera 68, "C" or "P", the exposed image areas on the filmstrip 30 are always in the "H" format. The "H" format portion of an exposed image area on the filmstrip 30 has a width of approximately 27.4 mm and a height of approximately 15.6 mm. The "C" format portion of an exposed image area on the filmstrip 30 has a width of approximately 22.3 mm and a height of approximately 15.6 mm. The "P" format portion of an exposed image area of the filmstrip 30 has a width of approximately 27.4 mm and a height of approximately 9.6 mm.

As can be seen from FIGS. 5 and 6, when the P" format defining mask 50 is translated (to the right) from its operative partial-masking position between the front viewfinder lens 74 and the front viewfinder opening 78 in the front cover part 70 to its idle non-masking position removed from between the front viewfinder lens and the front viewfinder opening, a switch closing actuator 80 connected to the mask bears against the resilient movable switch member 56 to press that switch member against the fixed switch member 54, in order to close the "C" format-encodement-on-film closeable switch 52. Consequently, the "C" format-encodement-on-film LED 58 is briefly illuminated to expose a single data bit, i.e. the binary 1 (immediately before the manufacturer-provided binary 1), on the filmstrip 30 adjacent an exposed image area. The switch closing actuator 80 has an inclined actuating surface 82 followed by a flat holding surface 84 which in succession bear against a flat or slightly inclined follower surface 86 on the resilient movable switch member 56 to press that switch member against the fixed switch member 54. The flat or slightly inclined follower surface 86 on the resilient movable switch member 56 in FIGS. 4–6 is at a different location than the inclined follower surface 66 on the resilient movable switch member in FIGS. 1–3.

The invention has been described with reference to a preferred embodiment. However, it will be appreciated that variations and modifications can be effected by a person of ordinary skill in the art without departing from the scope of the invention.

What is claimed is:

1. A method of constructing two different variable format cameras, comprising the steps of:

providing a viewfinder in each of the cameras;

providing a single format mask supported for movement into and out of the viewfinder in one of the cameras, and an identical format mask supported for movement into and out of the viewfinder in the other camera;

providing a format-encodement-on-film closeable switch in one of the cameras, and an identical switch in the other camera; and providing a closing actuator connected to the mask in one of the cameras to close the switch in that camera when the mask is moved into the viewfinder in that camera, and a different closing actuator connected to the mask in the other camera to close the switch in that camera when the mask is moved out of the viewfinder in that camera.

2. A method of constructing two different variable format cameras as recited in claim 1, comprising the further step of:

providing a single format-encodement-on-film light source connected with the format-encodement-on-film closeable switch in one of the cameras to make possible an optical encodement on film when that switch is closed, and an identical light source connected with said format-encodement-on-film closeable switch in the other camera to make possible an optical encodement on film when that switch is closed.

* * * * *